Patented Apr. 28, 1953

2,636,910

UNITED STATES PATENT OFFICE 2,636,910

PROCESS FOR TREATING POLYMERS PRODUCED BY ALKALI METAL CATALYZED POLYMERIZATIONS

Willie W. Crouch, Bartlesville, Okla., assignor to Phillips Petroleum Company, a corporation of Delaware No Drawing. Application April 22, 1949, Serial No. 89,142

10 Claims. (Cl. 260—677)

This invention relates to an improved process for treating polymers produced by alkali metal catalyzed polymerization. In one embodiment it relates to treatment of polymers produced by alkali metal catalyzed polymerization of monomeric material containing a conjugated double bond system. In a specific embodiment it relates to treating liquid polybutadiene produced by solution polymerization of 1,3-butadiene in the presence of metallic sodium as a catalyst.

The polymerization of conjugated diolefins, such as butadiene, in the presence of alkali metal catalysts, in the presence or absence of a solvent, is well known. Solid or liquid polymers may be produced using these catalysts; liquid polymers are readily formed by operating at relatively high temperatures with a solvent, such as benzene or heptane, to obtain a solution of a liquid polymer in the solvent.

In the alkali metal catalyzed polymerization of conjugated diolefins it is necessary to treat the resulting reaction mixture in some manner to convert the alkali metal and reactive alkali metal-organo compounds present therein to prevent further effect of these materials on the product. Alkali metal catalysts are harmful if left in the product because they promote cross-linking of the polymer with concomitant formation of gel. The alkali metal-organic compounds are further deleterious because they impart a dark red and sometimes almost black color to the polymer which is not permissible for many uses of these products.

A number of methods for converting these catalyst residues to a harmless form have been tried. Washing with water has been a common procedure but troublesome emulsions are formed when this method is employed with the resultant formation of a cloudy product. The removal of the alkali metal hydroxides formed during water washing can be accomplished only with great difficulty. Further, the presence of such hydroxides is deleterious for many uses of the polymers. Washing a hydrocarbon solution of a liquid polymer with dilute aqueous sulfuric acid has been attempted but the color is discharged only after extended periods of contacting. Further, when the polymer is heated to distill off the solvent it is again darkened.

It was therefore surprising to discover that sulfur dioxide gas or a solution of sulfur dioxide in water will quickly discharge the dark color when washing a hydrocarbon solution of a liquid polymer produced by alkali metal catalyzed polymerization.

An object of this invention is to provide an improved process for the treatment of a polymer produced by alkali metal catalyzed polymerization.

Another object is to provide an improved process for treating a liquid polymer produced by solution polymerization of conjugated diolefins in the presence of an alkali metal catalyst wherein a clear, transparent, substantially colorless, stable product is obtained.

Another object of this invention is to treat a liquid co-polymer prepared by co-polymerization of conjugated diolefins and aromatic compounds containing a vinyl group in the presence of an alkali metal catalyst whereby the alkali metal and alkali metal-organo compounds contained in the co-polymer are converted to a less harmful form.

Still another object of this invention is to provide a method for treating liquid polybutadiene produced by the solution polymerization of 1,3-butadiene in the presence of an alkali metal catalyst whereby the alkali metal and alkali metal-organo compounds contained in the polybutadiene are converted to a less harmful form.

Still another object is to convert alkali metal and/or alkali metal-organo compounds contained in liquid polymers to a less harmful form.

Still other objects and advantages of the present invention will become apparent to those skilled in the art from the accompanying disclosure and description.

According to one embodiment of this invention, a polymer prepared by the alkali metal catalyzed polymerization is dissolved in a hydrocarbon solvent and allowed to stand for a period of time sufficient to permit the alkali metal to settle. Usually a period of time not in excess of two hours is satisfactory; however, in some cases it may be desirable to allow the solution to stand for a longer period of time, such as up to three to five hours or even more. The alkali metal is then removed from the polymer solution by decantation, filtration or the like. The decanted polymer solution containing alkali metal-organo compounds plus any residual alkali metal is then intimately contacted with gaseous sulfur dioxide. This may be done, for example, by bubbling the sulfur dioxide through the solution. By this treatment, the dark color of the polymer is quickly removed. The polymer solution is then separated from any precipitate that may be formed during this treatment and the solvent is removed from the polymer. A clear, transparent, substantially colorless liquid polymer results which does not darken upon removal of the solvent as is the case with a polymer that has been treated with water or a dilute sulfuric acid solution.

In another embodiment of this invention, a dilute aqueous solution of sulfur dioxide is employed as the treating agent with equal effectiveness. By this treatment, the solution of sulfur dioxide and the solution of polymer are intimately mixed by any suitable means, such as by mechanical mixing or the like. When using a water solution the alkali metal may first be removed from the polymerization product or it may be left in the polymer, as desired. When treating with such a solution very little emulsification is encountered during the process of contacting the two phases. The color disappearance using dilute sulfur dioxide solutions is also very rapid compared to the use of dilute sulfuric acid solutions. This is believed to be due to the high vapor pressure of sulfur dioxide which causes rapid diffusion of sulfur dioxide vapor into the polymer solution phase. After treatment, the polymer solution and water phases are allowed to separate and the solvent is stripped from the polymer. Generally, a period of 15 minutes to six hours is sufficient to permit separation of the layers. The treated polymer has the desirable characteristics of a clear, transparent, substantially colorless liquid. The polymers treated according to this invention remain clear indefinitely on standing with no precipitation occurring.

The exact mechanism of the reaction between the sulfur dioxide and the colored alkali metal-organo compounds is not known, but it is believed that alkali metal salts of long chain sulfinic acids are formed. These sulfinic acids or their alkali metal salts probably remain dissolved in the polymer and may be advantageous for some uses of the polymer. When an aqueous solution of sulfur dioxide is employed these alkali metal salts will dissolve to a certain degree and may thereby be removed from the polymer.

This invention applies to polymers made by the solution polymerization of conjugated dienes, such as 1,3-butadiene, isoprene or 2,3-dimethyl-1,3-butadiene either alone or in admixture with each other and/or with minor proportions of other monomers copolymerizable therewith, such as styrene, methyl styrene, vinyl naphthalene, and the like.

In specifying that the polymers to which this invention is applicable are made in the presence of alkali metal catalysts, I have meant not only the alkali metals, such as sodium, potassium and lithium, but also alkali metal-organo compounds, such as sodium butyl, sodium triphenyl methyl and the like, and alkali metal hydrides. These materials are examples of catalysts within the group consisting of the alkali metals, the alkali metal hydrides, the alkali metal alkyls, and the alkali metal aryls. In some cases polymers may be made by use of these catalysts and in the absence of a solvent, per se, and in such cases the polymers may be dissolved in any suitable inert hydrocarbon solvent, such as pentane, hexane, heptane, octane, cyclohexane, benzene, toluene, xylene and the like. Usually the solution of polymer in solvent will comprise of from 10 to 75 weight per cent of polymer.

In carrying out the process of this invention it is desirable to treat the polymer or a hydrocarbon solution of the polymer with sufficient sulfur dioxide to convert the alkali metal and/or alkali metal-organo compounds to a harmless form. The liquid polymer may be treated with gaseous or liquid sulfur dioxide or with an aqueous solution of sulfur dioxide. In treating polymers it is desirable to use at least the stoichiometrical quantity of sulfur dioxide to convert the alkali metal and/or the alkali metal-organo compounds contained therein to a harmless form; usually this amount can be determined by routine laboratory tests. When employing gaseous or liquid sulfur dioxide, or an aqueous solution thereof, usually from about 0.1 to 30 parts by weight of sulfur dioxide per 100 parts by weight of polymer are sufficient to convert the alkali metal and alkali metal-organo compounds to a harmless form. When employing an aqueous solution of sulfur dioxide the concentration of sulfur dioxide will usually fall in the range of 0.1 to 10 weight per cent. In any case, the exact amount of sulfur dioxide used will depend upon factors such as the amount of alkali metal and/or alkali metal-organo compounds present in the polymer, the temperature employed, the contact time, the amount of solvent in which the polymer is dissolved, and the like.

The process of this invention is preferably carried out at a temperature in the range of about 40 to 180° F. and at about atmospheric pressure; however, the temperature and pressure both may be higher or lower, if desired, in certain cases. Very seldom will it be desirable to operate at a lower pressure, since contact of the sulfur dioxide with the material being treated would be more difficult to maintain on account of the normally gaseous state of the sulfur dioxide. When treating with liquid sulfur dioxide sufficient pressure is used to keep the sulfur dioxide in liquid phase.

The following examples will more fully illustrate the process but my invention is not restricted to the conditions therein.

*Example I*

A mixture of 2.35 pounds n-heptane and 0.0134 pound sodium dispersed in xylene was charged to a stainless steel, jacketed autoclave equipped with a stirrer. The mixture was heated to a temperature of 185° F., the stirrer was started and 1,3-butadiene was introduced until the pressure reached about 16 pounds per square inch gauge. Thereafter, butadiene was added to control the pressure at a substantially constant value of about 16 pounds per square inch gauge. The total quantity of butadiene charged was 1.34 pounds. The temperature was held at 185 to 195° F. throughout the polymerization. After the reaction was substantially complete, the polymer solution was withdrawn from the reactor and most of the metallic sodium was removed by settling and decanting the polymer solution.

To 100 parts by volume of the decanted reaction mixture was added 100 parts by volume of water to which had been added 0.5 weight per cent sulfur dioxide. The mixture was stirred for about 10 minutes and the dark red solution rapidly decolorized. No emulsification occurred. The mixture was allowed to stand for approximately two hours to allow the layers to separate, and the polymer solution was withdrawn and stripped free of the solvent. The resulting polymer was a clear, transparent, substantially colorless liquid.

*Example II*

The procedure described in Example I was repeated using a saturated solution of sulfur dioxide in water as the treating reagent. Results were substantially identical except that decolorization was even more rapid.

*Example III*

Another sample of the polymer solution prepared as described in Example I was saturated with sulfur dioxide gas whereupon rapid decolorization occurred. The polymer solution was washed with water and subsequently stripped to remove the solvent. The resulting product had the same desirable characteristics as the product of Example I.

It is to be understood that this invention should not be unnecessarily limited to the above discussion and description and that modifications and variations may be made without departing from the invention or from the scope of the claims.

I claim:

1. In a process for the treatment of a liquid polybutadiene produced by solution polymerization of 1,3-butadiene in the presence of an alkali metal catalyst and which is discolored by resulting organic compounds of said alkali metal, the improvement which comprises treating about 100 parts by weight of said polybutadiene dissolved in a paraffinic solvent containing at least five and not more than eight carbon atoms per molecule with a material consisting essentially of from 0.1 to 30 parts by weight of sulfur dioxide, thereby converting the alkali metal and alkali metal-organic compounds contained in said polybutadiene to a colorless form.

2. A process for the treatment of a liquid polybutadiene produced by solution polymerization of 1,3-butadiene in the presence of metallic sodium as a catalyst and which is discolored by resulting organic compounds of sodium, which comprises treating about 100 parts by weight of said polybutadiene dissolved in heptane with a material consisting essentially of from 0.1 to 30 parts by weight of sulfur dioxide contained in an aqueous solution having a concentration of from 0.1 to 10 weight per cent sulfur dioxide, thereby converting the sodium and sodium-organic compounds contained in said polybutadiene to a colorless form.

3. A method for treating a liquid polymer produced by solution polymerization of a conjugated diolefin in the presence of an alkali metal catalyst, which comprises treating the resulting liquid polymer solution with a material consisting essentially of an aqueous solution containing a concentration of sulfur dioxide in the range of from 0.1 to 10 weight per cent.

4. In a process for the treatment of a liquid polybutadiene produced by solution polymerization of 1,3-butadiene in the presence of an alkali metal catalyst and which is discolored by resulting organic compounds of said alkali metal, the improvement which comprises treating the resulting polybutadiene solution with a material consisting essentially of at least the stoichiometrical quantity of sulfur dioxide to convert the alkali metal and alkali metal-organo compounds contained in said polybutadiene to a colorless form.

5. A method for treating a liquid polymer produced by the alkali metal polymerization of a conjugated diolefin, which comprises treating the resulting liquid polymer with a material consisting essentially of at least the stoichiometrical amount of sulfur dioxide to convert the alkali metal and alkali metal organic compounds contained in said polymer to a less harmful form, said sulfur dioxide being contained in an aqueous solution having a concentration of sulfur dioxide in the range of about 0.1 to 10 weight per cent.

6. In a process for the treatment of a liquid co-polymer produced by solution co-polymerization of 1,3-butadiene and styrene in the presence of an alkali metal catalyst and which is discolored by resulting organic compounds of said alkali metal, the improvement which comprises treating about 100 parts by weight of said co-polymer dissolved in an inert hydrocarbon solvent with a material consisting essentially of from 0.1 to 30 parts by weight of sulfur dioxide, said sulfur dioxide being contained in an aqueous solution having from 0.1 to 10 weight per cent of sulfur dioxide, thereby converting the alkali metal and alkali metal-organic compounds contained in said co-polymer to a colorless form.

7. A method for treating a polymer produced by polymerization of a conjugated diolefin in the presence of an alkali metal catalyst and which is discolored by resulting organic compounds of said alkali metal, which comprises treating the resulting polymer with a material consisting essentially of at least the stoichiometrical quantity of sulfur dioxide to convert the alkali metal and alkali metal-organo compounds to a colorless form.

8. In a process for the treatment of a liquid co-polymer produced by solution co-polymerization of a conjugated diolefin and an aromatic compound containing a vinyl group in the presence of an alkali metal catalyst and which is discolored by resulting organic compounds of said alkali metal, the improvement which comprises treating the resulting co-polymer solution with a material consisting essentially of at least the stoichiometrical amount of sulfur dioxide to convert the alkali metal and alkali metal-organo compounds to a colorless form.

9. A process for decolorizing a liquid polybutadiene produced by polymerization of butadiene in the presence of a sodium polymerization catalyst and which is discolored by the presence of organic sodium compounds produced during said polymerization, which comprises passing a material consisting essentially of gaseous sulfur dioxide into said polybutadiene at 40 to 180° F. until a colorless liquid is obtained, and thereafter washing said treated polybutadiene with water.

10. A process for decolorizing a hydrocarbon liquid which is discolored by the presence of an organic compound of an alkali metal, which comprises passing a material consisting essentially of gaseous sulfur dioxide into said hydrocarbon liquid at 40 to 180° F. until a colorless hydrocarbon liquid is obtained, and thereafter washing said treated hydrocarbon liquid with water.

WILLIE W. CROUCH.

References Cited in the file of this patent

UNITED STATES PATENTS

| Number | Name | Date |
| --- | --- | --- |
| 2,466,694 | Freed | Apr. 12, 1949 |

FOREIGN PATENTS

| Number | Country | Date |
| --- | --- | --- |
| 545,193 | Great Britain | May 14, 1942 |